US012624730B2

(12) United States Patent
Motoda

(10) Patent No.: US 12,624,730 B2
(45) Date of Patent: May 12, 2026

(54) ROLLER BEARING

(71) Applicant: NSK Ltd., Tokyo (JP)

(72) Inventor: Tomohiro Motoda, Fujisawa (JP)

(73) Assignee: NSK Ltd., Tokyo (JP)

( * ) Notice: Subject to any disclaimer, the term of this patent is extended or adjusted under 35 U.S.C. 154(b) by 7 days.

(21) Appl. No.: 17/795,655

(22) PCT Filed: Jan. 26, 2021

(86) PCT No.: PCT/JP2021/002633
§ 371 (c)(1),
(2) Date: Jul. 27, 2022

(87) PCT Pub. No.: WO2021/157429
PCT Pub. Date: Aug. 12, 2021

(65) Prior Publication Data
US 2023/0083177 A1     Mar. 16, 2023

(30) Foreign Application Priority Data

Feb. 7, 2020     (JP) ................................. 2020-019783

(51) Int. Cl.
*F16C 35/06*          (2006.01)
*F16C 19/04*          (2006.01)
(Continued)

(52) U.S. Cl.
CPC ............ *F16C 35/067* (2013.01); *F16C 19/04* (2013.01); *F16C 33/586* (2013.01); (Continued)

(58) Field of Classification Search
CPC ...... F16C 19/04; F16C 33/586; F16C 35/063; F16C 35/067; F16C 2226/50; F16C 2226/80
See application file for complete search history.

(56) References Cited

U.S. PATENT DOCUMENTS 5,058,262 A * 10/1991 Brockmuller ......... F16C 33/586
                                                              384/585
9,435,380 B2 * 9/2016 Suzuki .................. F16C 35/063
(Continued)

FOREIGN PATENT DOCUMENTS

JP          6-32746 U      4/1994
JP          10-37967 A     2/1998
(Continued)

OTHER PUBLICATIONS

Machine translation of JP-2009041644-A (Year: 2009).*
(Continued)

*Primary Examiner* — Alan B Waits
(74) *Attorney, Agent, or Firm* — Crowell & Moring LLP

(57)          ABSTRACT

A roller bearing includes an outer ring, an inner ring, and plural rolling elements rollably interposed between mutual raceway surfaces of the outer and inner rings, and is used by fitting an outer diameter surface of the outer ring serving as a fitting surface to a housing serving as a mating member or by fitting an inner diameter surface of the inner ring serving as a fitting surface to a shaft serving as the mating member. The fitting surface is provided with at least one protrusion so that a static torque $T_{hold}=\Sigma(F\times r)$ generated by the protrusion is equal to or greater than a torque $T_{creep}$ generated by creep.

4 Claims, 9 Drawing Sheets

(51) Int. Cl.
  F16C 33/58        (2006.01)
  F16C 35/063       (2006.01)
  F16C 35/067       (2006.01)
(52) U.S. Cl.
  CPC ........ F16C 35/063 (2013.01); F16C 2226/50 (2013.01); F16C 2226/80 (2013.01)

(56)                References Cited

U.S. PATENT DOCUMENTS

| | | | | |
|---|---|---|---|---|
| 2003/0210841 A1* | 11/2003 | Linden | .................. | F16C 35/073 384/537 |
| 2014/0086520 A1 | 3/2014 | Niwa | | |
| 2014/0254970 A1 | 9/2014 | Guilford | | |
| 2019/0078620 A1* | 3/2019 | Considine | ............. | F16C 33/586 |

FOREIGN PATENT DOCUMENTS

| | | | | |
|---|---|---|---|---|
| JP | 11-246823 | A | | 9/1999 |
| JP | 11-303859 | A | | 11/1999 |
| JP | 2002-266870 | A | | 9/2002 |
| JP | 2004-176785 | A | | 6/2004 |
| JP | 2005-48866 | A | | 2/2005 |
| JP | 2009-41644 | A | | 2/2009 |
| JP | 2009041644 | A | * | 2/2009 |
| JP | 2009-234480 | A | | 10/2009 |
| JP | 2012-241875 | A | | 12/2012 |
| JP | 2014-234907 | A | | 12/2014 |
| JP | 2018-9669 | A | | 1/2018 |
| JP | 2018119580 | A | * | 8/2018 |

OTHER PUBLICATIONS

Machine translation of JP-2018119580-A (Year: 2018).*
"Kobayashi: Seimitsu Kikai (Precision Machine)", 1957, pp. 532-539, vol. 23, No. 273, with English translation (17 pages).
International Preliminary Report on Patentability (PCT/IB/338 & PCT/IB/373) issued in PCT Application No. PCT/JP2021/002633 dated Aug. 18, 2022, including English translation of document C2 (Japanese-language Written Opinion (PCT/ISA/237) filed on Jul. 27, 2022) (seven (7) pages).
Extended European Search Report issued in European Application No. 21750726.8 dated May 30, 2023 (10 pages).
International Search Report (PCT/ISA/210) issued in PCT Application No. PCT/JP2021/002633 dated Mar. 16, 2021 with English translation (seven (7) pages).
Japanese-language Written Opinion (PCT/ISA/237) issued in PCT Application No. PCT/JP2021/002633 dated Mar. 16, 2021 (five (5) pages).
Chinese-language Office Action issued in Chinese Application No. 202180011633.0 dated Jun. 18, 2025 with English translation (22 pages).
Chinese-language Office Action issued in Chinese Application No. 202180011633.0 dated Sep. 9, 2025 with English translation (20 pages).
Korean-language Office Action issued in Korean Application No. 10-2022-7026736 dated Oct. 16, 2025 with English translation (12 pages).

* cited by examiner

FIG. 4

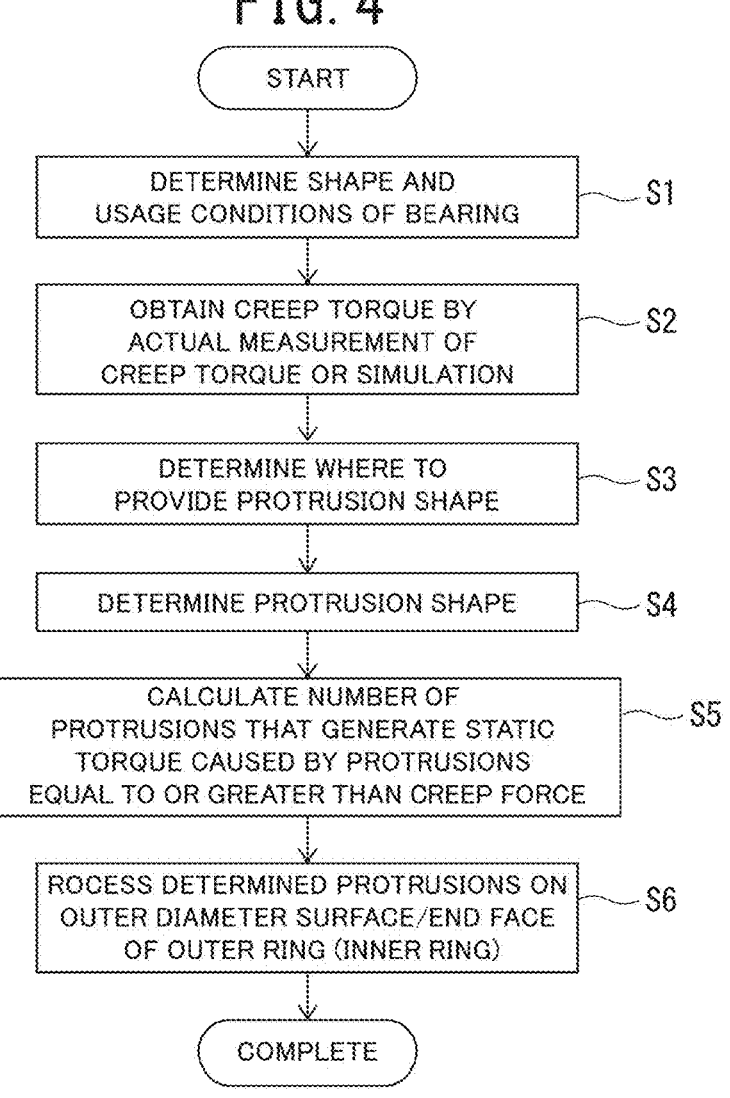

START

DETERMINE SHAPE AND
USAGE CONDITIONS OF BEARING — S1

OBTAIN CREEP TORQUE BY
ACTUAL MEASUREMENT OF
CREEP TORQUE OR SIMULATION — S2

DETERMINE WHERE TO
PROVIDE PROTRUSION SHAPE — S3

DETERMINE PROTRUSION SHAPE — S4

CALCULATE NUMBER OF
PROTRUSIONS THAT GENERATE STATIC
TORQUE CAUSED BY PROTRUSIONS
EQUAL TO OR GREATER THAN CREEP FORCE — S5

ROCESS DETERMINED PROTRUSIONS ON
OUTER DIAMETER SURFACE/END FACE
OF OUTER RING (INNER RING) — S6

COMPLETE

FIG. 5

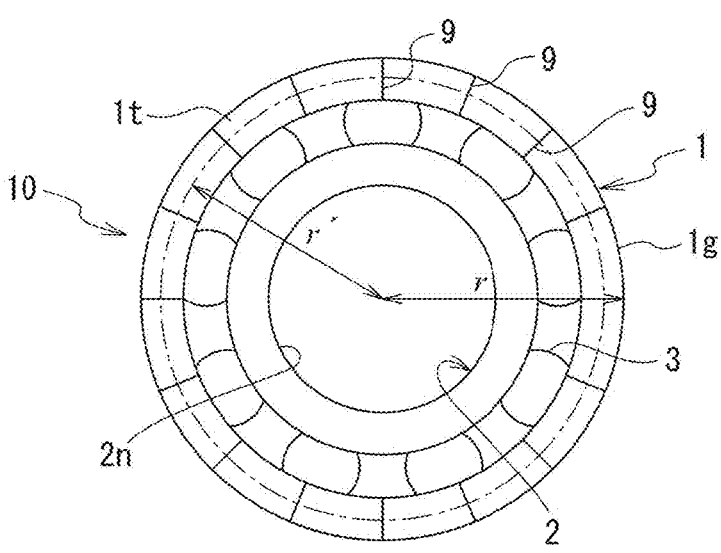

FIG. 9A
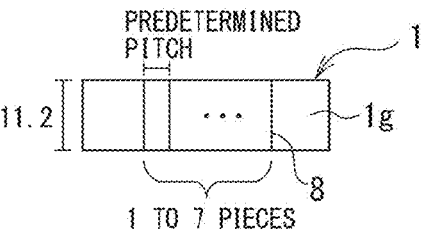
PREDETERMINED PITCH
11.2
1
1g
8
1 TO 7 PIECES
FIG. 9B   FIG. 9C   FIG. 9D
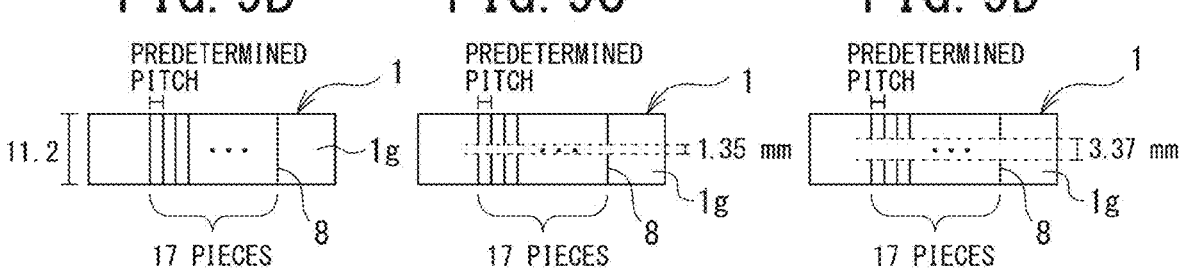
PREDETERMINED PITCH
11.2
1
1g
8
17 PIECES
PREDETERMINED PITCH
1
1.35 mm
1g
8
17 PIECES
PREDETERMINED PITCH
1
3.37 mm
1g
8
17 PIECES
FIG. 9E   FIG. 9F
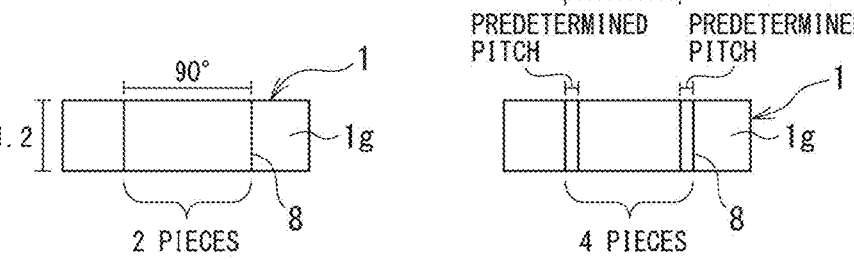
90°
11.2
1
1g
8
2 PIECES
90°
PREDETERMINED PITCH   PREDETERMINED PITCH
1
1g
8
4 PIECES
FIG. 9G   FIG. 9H
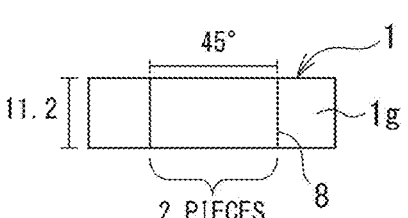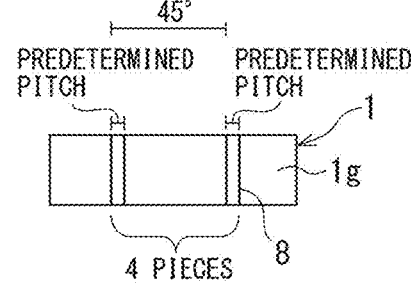
45°
11.2
1
1g
8
2 PIECES
45°
PREDETERMINED PITCH   PREDETERMINED PITCH
1
1g
8
4 PIECES
FIG. 9I   FIG. 9J   FIG. 9K
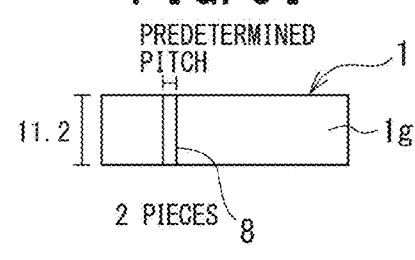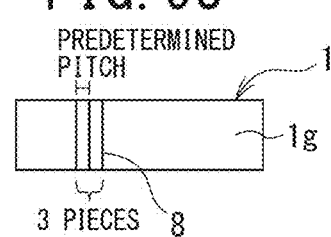
PREDETERMINED PITCH
11.2
1
1g
2 PIECES   8
PREDETERMINED PITCH
1
1g
3 PIECES   8
PREDETERMINED PITCH
1
1g
4 PIECES   8

FIG. 11A
FIG. 11B
FIG. 11C
FIG. 11D
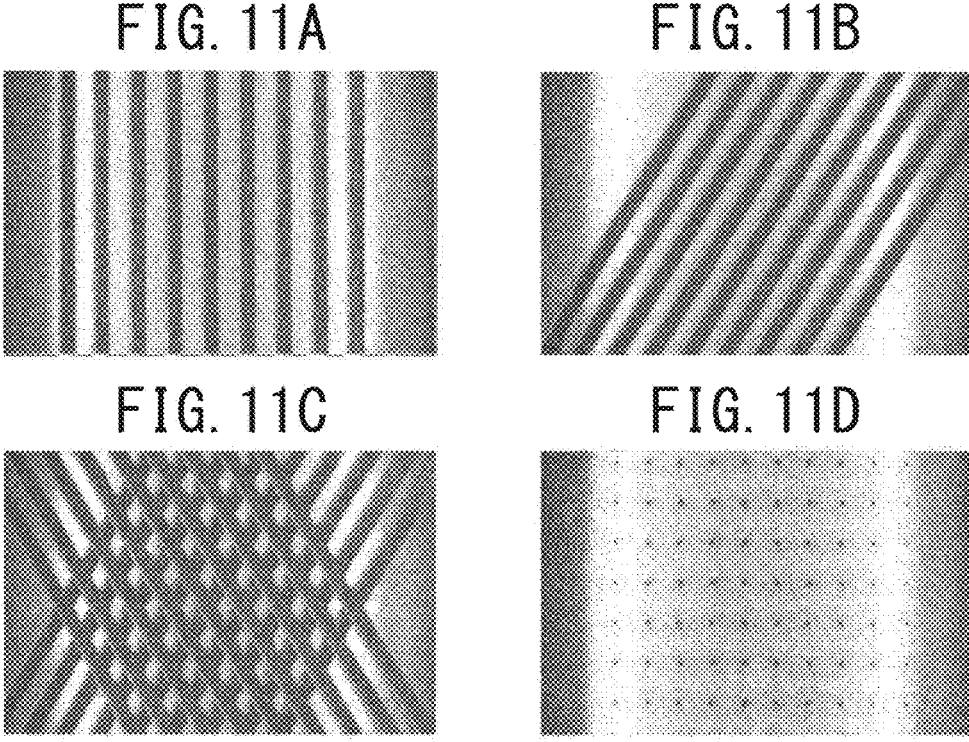
FIG. 12
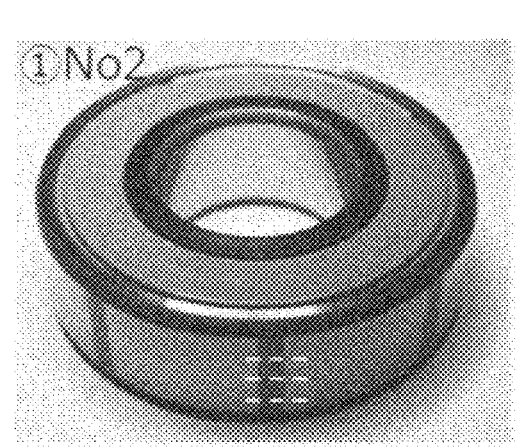
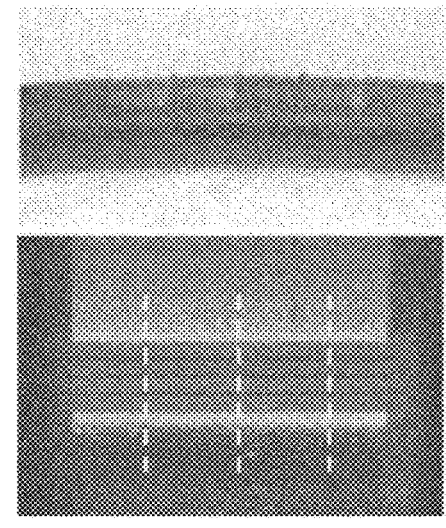

CROSS-SECTIONAL SHAPE OF RIDGE SHAPE

10 μm 0.2 mm

5 μm

50 μm

ROLLER BEARING

TECHNICAL FIELD

The present invention relates to roller bearings, and in particular, to roller bearings used in such a state that creep of a raceway ring occurs or may occur with respect to a mating member such as a housing. Here, in roller bearings, when used by fitting an outer diameter surface of an outer ring to a housing or by fitting a shaft to an inner diameter surface of an inner ring, a phenomenon in which the outer or inner ring rotates relative to a mating member such as the housing or the shaft may occur. The phenomenon is called creep.

BACKGROUND ART

Due to a demand for reduction in sizes and weights of various rotating mechanical devices, some roller bearings are becoming thinner in a raceway ring such as an outer or inner ring. In the case of a roller bearing whose outer ring is fitted to a housing, thinning of the outer ring causes significant elastic deformation of an outer diameter surface of the outer ring under rolling element load. Changes in strain of the outer diameter surface of the outer ring caused by repetitive application of the rolling element load cause outer ring creep.

At this time, the outer diameter surface of the outer ring rubs against an inner surface of the housing, thereby causing wear on the housing and the outer diameter of the outer ring. As the wear increases, rattling occurs in a rotation supporting portion of the rotating machine device, which causes abnormal vibration and failure of the rotating machine device. Even when the inner ring is made thinner, the same phenomenon (inner ring creep) occurs. In this case, the shaft and the inner diameter of the inner ring are worn.

To prevent creep from occurring on the outer diameter surface of the outer ring, for example, PTL 1 describes a technology in which an axial direction shape of the outer diameter surface of an outer ring is machined not into a straight one but a shape with an arc-shaped recess. Then, the bearing with such a recess formed on the outer diameter surface of the outer ring is press-fitted into a housing, and a large tightening allowance formed at both ends of the outer ring prevents the occurrence of creep.

However, in the technology described in this literature, the outer ring needs to be press-fitted into the housing with a large force, and it is not easy to attach the outer ring. Besides that, although pins and flanges may be provided to prevent rotation, the number of parts increases, and the shapes of the bearing and the housing become complicated. Therefore, in addition to increased machining cost and size, manufacturing cost also increases because the work of attaching the bearing to the housing becomes complicated.

PTL 2 describes a technology of covering the outer diameter surface of an outer ring with a lubricating film made of a thermosetting synthetic resin composition containing molybdenum disulfide, antimony, and the like. The lubricating film has lubricity and is essentially resinous. Therefore, the lubricating film is softer than aluminum and aluminum alloys, which are common housing materials, and even when creep occurs, wear of an inner peripheral surface of the housing can be prevented. Additionally, since it is only necessary to form the lubricating film, the technology is applicable to various types of roller bearings and is also highly versatile.

However, the lubricating film in this literature is obtained by applying a solution of a thermosetting synthetic resin composition containing molybdenum disulfide or the like dissolved in a solvent and heating to evaporate the solvent, and may not be sufficient in film strength and durability.

A technology described in PTL 3 provides an O-ring on the outer diameter surface of an outer ring to fill a gap between a housing and a bearing, and repulsive force of rubber forming the O-ring prevents creep. However, when the housing unexpectedly expands, the repulsive force of the rubber is reduced, and creep may occur. Additionally, a step of cutting a groove in the rubber, and the rubber itself or a step of combining them are costly, resulting in increased manufacturing cost.

In a technology described in PTL 4, the wall thickness of an outer ring is thickened to increase rigidity, thereby suppressing elastic deformation of the outer ring to prevent the occurrence of creep. However, to completely prevent the occurrence of creep, the wall thickness of the outer ring must be very thick. This can easily lead to an increase in bearing size.

In a technology described in PTL 5, a piston ring is covered with a heat-resistant resin containing molybdenum disulfide, antimony, and the like. Polyamide imide is used as the heat-resistant resin, and phenol resin is used as a curing agent.

The technology described in this literature uses phenol resin as the curing agent, and therefore, firing in Examples is performed at from 180 to 220° C. However, SUJ 2, which is widely used for bearings, has a firing temperature of approximately 120° C., and thus cannot be used because such a high firing temperature causes deformation or softening of the bearing.

CITATION LIST

Patent Literature

PTL 1: JP H10-37967 A
PTL 2: JP 2002-266870 A
PTL 3: JP 2004-176785 A
PTL 4: JP 2012-241875 A
PTL 5: JP H11-246823 A
PTL 6: JP 2018-119580 A

Non Patent Literature

NPL 1: Kobayashi: Seimitsu Kikai (Precision Machine), vol. 23, No. 273 (1957), p. 532-539

SUMMARY OF INVENTION

Technical Problem

Here, a technology described in PTL 6 provides a groove having a raised edge along an axial direction at a plurality of locations on an outer diameter surface of an outer ring to increase roughness, thereby increasing frictional force and enabling prevention of creep. In the technology described in this literature, the raised shape only contacts with a housing serving as a mating member without biting thereinto. Accordingly, a height of the raised shape forms a gap between the housing and the outer diameter surface of the outer ring, thereby facilitating passage of a lubricating oil, so that wear due to creep can be prevented. In other words, since there are many protrusions on the outer diameter surface of the outer ring, it can be said that surface pressure acting on one protrusion is low, and the protrusions do not bite into the housing.

However, sliding due to creep is very slow, and the bearing is in a boundary lubrication state where solid contact occurs even when the outer diameter surface of the outer ring has no raised portion. In addition, in the technology described in the literature, the raised shape only contacts with the housing serving as the mating member without biting thereinto. Therefore, even when roughness is increased by the raised portion provided on the outer diameter surface of the outer ring, there is no increase in ploughing resistance, and no improvement in the frictional force is expectable. Additionally, it is unlikely that wear is reduced even when the lubricant is supplied. On the contrary, since the roughness of the outer diameter surface of the outer ring is large and moreover the lubricant is supplied, an ability of the raised portion to cut the mating member (abrasive action) is improved, which may increase the wear due to creep.

Accordingly, the present invention has been made with a focus on such a problem. An object of the present invention is to provide a roller bearing used by fitting an outer diameter surface of an outer ring serving as a fitting surface to a housing serving as a mating member or by fitting an inner diameter surface of an inner ring serving as a fitting surface to a shaft serving as the mating member, the roller bearing being capable of stably maintaining excellent creep resistance over a long period.

Solution to Problem

In order to achieve the above object, a roller bearing according to an aspect of the present invention includes an outer ring and an inner ring mutually having a raceway surface; and a plurality of rolling elements rollably interposed between the mutual raceway surfaces of the outer ring and the inner ring, the roller bearing being used by fitting an outer diameter surface of the outer ring serving as a fitting surface to a housing serving as a mating member or by fitting an inner diameter surface of the inner ring serving as a fitting surface to a shaft serving as the mating member, wherein the fitting surface of the outer ring or the inner ring is provided with at least one protrusion biting into the mating member of the outer ring or the inner ring so that a static torque generated by the at least one protrusion is greater than a torque generated by creep. In other words, the at least one protrusion is provided so that a static torque Thold generated by the at least one protrusion satisfies the following (formula):

$$\text{Static torque } T_{hold} \text{ generated by protrusion} \geq \text{torque } T_{creep} \text{ generated by creep} \quad \text{(formula)}$$

in which, $T_{hold} = \Sigma(F \times r)$, and $T_{creep} = F_{creep} \times r$.

F is a frictional force generated by one protrusion on the fitting surface of the outer ring or the inner ring, F being either a frictional force including an adhesion term ($F_{adhesion}$) and a ploughing term ($F_{ploughing}$) (a force preventing the outer ring or the inner ring from creeping, which force acts in a direction opposite to a direction of rotation due to creep) or a frictional force due only to the ploughing term ($F_{ploughing}$), and $\Sigma(F \times r)$ is a static torque generated by all the at least one protrusion. Additionally, $F_{creep}$ is a creep force acting tangentially to the fitting surface of the outer ring or the inner ring, and r is a distance of half an outer diameter of the outer ring or an inner diameter of the inner ring.

In addition, in order to achieve the above object, a roller bearing according to another aspect of the present invention includes an outer ring and an inner ring mutually having a raceway surface; and a plurality of rolling elements rollably interposed between the mutual raceway surfaces of the outer ring and the inner ring, the roller bearing being used by fitting an outer diameter surface of the outer ring serving as a fitting surface to a housing serving as a mating member and contacting an end face of the outer ring with the housing or by fitting an inner diameter surface of the inner ring serving as a fitting surface to a shaft serving as the mating member and contacting an end face of the inner ring with the shaft, wherein the end face of the outer ring to be fitted or the end face of the inner ring to be fitted is provided with at least one protrusion biting into the mating member of the outer ring or the inner ring so that a static torque $T_{hold}$ generated by the at least one protrusion satisfies the following (formula):

$$\text{Static torque } T_{hold} \text{ generated by protrusion} \geq \text{torque } T_{creep} \text{ generated by creep} \quad \text{(formula)}$$

in which $T_{hold} = \Sigma(F' \times r')$, and $T_{creep} = F_{creep} \times r$.

F' is a frictional force generated by one protrusion on the end face of the outer ring (or the inner ring), F' being either a frictional force including an adhesion term ($F_{adhesion}$) and a ploughing term ($F_{ploughing}$) (a force preventing the outer ring or the inner ring from creeping, which force acts in a direction opposite to a direction of rotation due to creep) or a frictional force due only to the ploughing term ($F_{ploughing}$), and r' is a distance from a center of the bearing to a center of the at least one protrusion present on the end face of the outer ring or the inner ring. Additionally, $\Sigma(F' \times r')$ is a static torque generated by all the at least one protrusion. In addition, $F_{creep}$ is a creep force acting tangentially to the fitting surface of the outer ring or the inner ring, and r is a distance of half an outer diameter of the outer ring or an inner diameter of the inner ring.

Furthermore, in order to achieve the above object, a roller bearing according to another aspect of the present invention includes an outer ring and an inner ring mutually having a raceway surface; and a plurality of rolling elements rollably interposed between the mutual raceway surfaces of the outer ring and the inner ring, the roller bearing being used by fitting an outer diameter surface of the outer ring serving as a fitting surface to a housing serving as a mating member and contacting an end face of the outer ring with the housing or by fitting an inner diameter surface of the inner ring serving as a fitting surface to a shaft serving as the mating member and contacting an end face of the inner ring with the shaft, wherein when at least one protrusion provided on the fitting surface of the outer ring or the inner ring in such a manner as to bite into the mating member of the outer ring or the inner ring is referred to as fitting portion protrusion and at least one protrusion provided on the end face of the outer ring to be fitted or the end face of the inner ring to be fitted in such a manner as to bite into the mating member of the outer ring or the inner ring is referred to as end face protrusion, at least one fitting portion protrusion and/or at least one end face protrusion are provided to bite into the mating member to be faced, in which a static torque $T_{hold}$ generated by the provided at least one protrusion satisfies the following (formula):

$$\text{Static torque } T_{hold} \text{ generated by protrusion} \geq \text{torque } T_{creep} \text{ generated by creep} \quad \text{(formula)}$$

in which $T_{hold} = \Sigma(F \times r) + \Sigma(F' \times r')$, and $T_{creep} = F_{creep} \times r$.

F is a frictional force generated by one protrusion on the fitting surface of the outer ring or the inner ring, F being either a frictional force including an adhesion term ($F_{adhesion}$) and a ploughing term ($F_{ploughing}$) (a force preventing the outer ring or the inner ring from creeping, which force acts in a direction opposite to a direction of rotation due to creep) or a frictional force due only to the ploughing term ($F_{ploughing}$), and r is a distance of half an outer diameter of the outer ring or an inner diameter of the inner ring. $\Sigma(F \times r)$ is a static torque generated by all the at least one protrusion provided on the fitting surface of the outer ring or the inner ring. In addition, F' is a frictional force generated by one protrusion on the end face of the outer ring (or the inner ring), F' being either a frictional force including the adhesion term ($F_{adhesion}$) and the ploughing term ($F_{ploughing}$) (a force preventing the outer ring or the inner ring from creeping, which force acts in a direction opposite to the direction of rotation due to creep) or a frictional force due only to the ploughing term ($F_{ploughing}$), and r' is a distance from a center of the bearing to a center of the at least one protrusion present on the end face of the outer ring or the inner ring. $\Sigma(F' \times r')$ is a static torque generated by all the at least one protrusion provided on the end face of the outer ring or the inner ring. Additionally, $F_{creep}$ is a creep force acting tangentially to the fitting surface of the outer ring or the inner ring, and r is a distance of half an outer diameter of the outer ring or an inner diameter of the inner ring.

Advantageous Effects of Invention

According to the present invention, the fitting surface of the outer or inner ring to be fitted or the end face of the outer ring to be fitted or the end face of the inner ring to be fitted is provided with a number of the protrusions biting into the mating member equal to or more than a number that satisfies the conditions of the desired (formula). The at least one protrusion generates a static torque greater than a torque generated by creep, thereby allowing for the prevention of occurrence of creep.

BRIEF DESCRIPTION OF DRAWINGS

FIG. 4 is a flowchart of a method for manufacturing the one embodiment of the roller bearing according to the one aspect of the present invention including at least one protrusion for preventing creep;

FIG. 5 is a diagram illustrating the roller bearing in which protrusions biting into the mating member are formed on an end face of the outer ring;

FIGS. 9A to 9K are diagrams illustrating various examples where at least one protrusion biting into the mating member is formed on a fitting surface of the outer ring or the inner ring of the roller bearing;

FIGS. 11A to 11D are photographs illustrating various examples where protrusions biting into the mating member are formed on the fitting surface of the outer ring of the roller bearing;

FIG. 12 is a photograph illustrating an example where protrusions biting into the mating member are formed on the fitting surface of the outer ring of the roller bearing;

FIGS. 15A and 15B are diagrams illustrating layout examples of the roller bearing, in which FIG. 15A is an example where an outer peripheral surface of the outer ring and an inner peripheral surface of the inner ring, respectively, of the roller bearing are fitted to the mating member, and FIG. 15B is an example where the outer peripheral surface of the outer ring and the inner peripheral surface of the inner ring, respectively, of the roller bearing are fitted to the mating member, and the end face of the outer ring to be fitted and the end face of the inner ring to be fitted, respectively, are in contact with the mating member; and FIGS. 16A and 16B are diagrams for illustrating various examples where protrusions biting into the mating member are formed on the fitting surface of the outer ring or the inner ring of the roller bearing, the diagram illustrating an example of the roller bearing where a plurality of protrusions is arranged at equal spacing in a circumferential direction of the fitting surface of the outer ring and closer to one end face of the outer ring in an axial direction, in which FIG. 16A is a perspective diagram of the example, and FIG. 16B is a plan view of the fitting surface of the outer ring.

DESCRIPTION OF EMBODIMENTS

Hereinafter, one embodiment of the present invention is described with appropriate reference to the drawings. Note that the drawings are schematic. Therefore, relationships, ratios, and the like between thicknesses and planar dimensions are different from actual ones. The drawings include portions different in dimensional relationships and ratios to each other.

Additionally, the embodiment given below exemplifies a device and a method for embodying the technological idea of the present invention, and the technological idea of the present invention does not limit the materials, shapes, structures, arrangements, and the like of components to those of the following embodiment.

A roller bearing according to the present embodiment is used by fitting an outer diameter surface of an outer ring to a housing serving as a mating member or by fitting a shaft serving as the mating member to an inner diameter surface of an inner ring.

Figure 1:
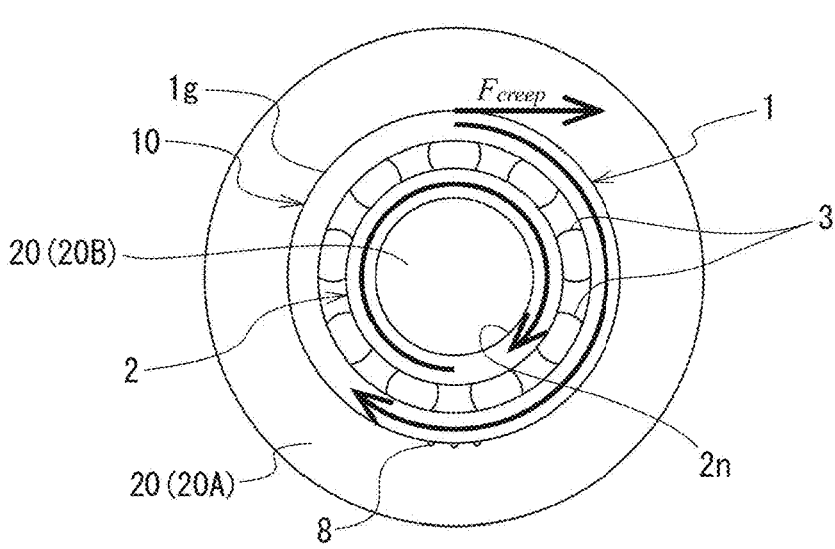
FIG. 1 is a schematic diagram illustrating a relationship between the configuration of one embodiment of a roller bearing according to one aspect of the present invention and creep.
Figure 2:
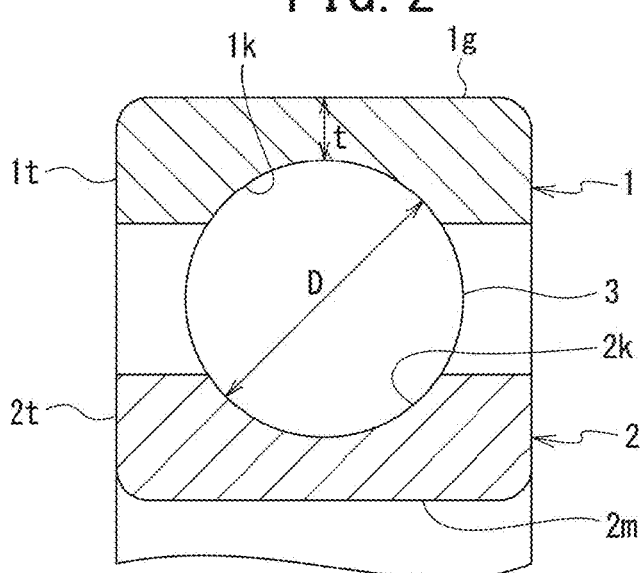
FIG. 2 is a schematic diagram illustrating a relationship between a value t/D of a raceway ring wall thickness of an outer ring or an inner ring divided by a rolling element diameter and the ease of occurrence of creep.

As illustrated in FIGS. 1 and 2, a roller bearing 10 of the present embodiment is an example of a deep groove ball bearing, and includes an outer ring 1 having a raceway surface 1k, an inner ring 2 having a raceway surface 2k, and a plurality of rolling elements 3 rollably interposed between the mutual raceway surfaces 1k and 2k of the outer ring 1 and the inner ring 2.

The roller bearing 10 of the present embodiment is used by fitting an outer diameter surface 1g of the outer ring 1 to a mating member 20 such as a housing 20A, and is an example where creep is prevented by partially increasing friction between the outer diameter surface 1g of the outer ring 1 and the mating member 20.

In the roller bearing 10 of the present embodiment, a fine protrusion 8 is provided at a plurality of locations on the outer diameter surface 1g of the outer ring 1 in such a manner as to bite into the mating member 20. The fine protrusion 8 generates a static torque greater than a torque generated by creep, thereby allowing for the prevention of occurrence of creep. Note that the degree of "fineness" of the protrusion 8 is defined as having a height of, for example, from a few μm to several tens of μm. If the height of the protrusion is made smaller than a fitting gap, when arranging the protrusion 8 to be biased to a part of the outer ring 1 or the inner ring 2 in a circumferential direction thereof, a portion formed without the protrusion is incorporated as a guide surface into the mating member 20 when assembling, thereby facilitating the assembly without damaging the mating member 20. Additionally, at this time, since the protrusion 8 is provided to bite into the mating member 20, there is no gap between the mating member 20 and the outer diameter surface 1g of the outer ring 1.

Particularly, as illustrated in FIG. 2, creep is likely to occur when a value t/D of a raceway ring wall thickness t of the outer ring 1 or the inner ring 2 divided by a diameter D of the rolling element 3 is equal to or less than 0.5. Thus, the present invention are effective in preventing creep in the roller bearing 10 having such internal specifications.

Here, when the outer ring 1 or the inner ring 2 rotates relative to the mating member 20 such as the housing 20A or a shaft 20B due to creep, it means that the creep generates a torque $T_{creep}$ to rotate. For example, when outer ring creep occurs, the creep torque $T_{creep}$ is represented by a product of a force (creep force) $F_{creep}$ acting tangentially to the outer diameter surface 1g of the outer ring 1 in FIG. 1 and a bearing radius r, as illustrated in the following formula (1):

$$T_{creep} = F_{creep} \cdot r \tag{1}$$

Creep does not occur when a static torque $T_{hold}$ generated by friction caused by the fine protrusion 8 formed on the surface of the outer diameter surface 1g of the outer ring 1 biting into the mating member 20 exceeds the creep torque $T_{creep}$. The creep torque $T_{creep}$ is known to vary depending on usage conditions of the roller bearing 10 and the internal specifications of the roller bearing 10.

Thus, in the present embodiment, as illustrated in a flowchart of FIG. 4, first, once the shape and usage conditions of the roller bearing 10 to be targeted is determined (step S1 of FIG. 4), the creep torque $T_{creep}$ is obtained in advance in order to design a surface capable of preventing creep in the roller bearing 10. The creep torque $T_{creep}$ may be obtained by actual measurement or may be predicted by a simulation using a finite element method (FEM) (step S2 of FIG. 4) if actual measurement is difficult.

Then, the occurrence of creep can be prevented by providing a surface that generates the static torque $T_{hold}$ equal to or greater than the creep torque $T_{creep}$ actually measured or predicted by the above-mentioned method on the fitting surface where creep occurs and an end face of the outer ring or the inner ring. For example, when the outer diameter surface 1g, which is the fitting surface of the outer ring 1, creeps and rubs against the housing 20A, the fine protrusion 8 capable of biting into the housing 20A is provided on the outer diameter surface 1g of the outer ring 1 so as to generate the static torque $T_{hold}$ equal to or greater than the creep torque $T_{creep}$.

Specifically, assume that when, as the roller bearing 10, a deep groove ball bearing having an outer diameter of 39 mm, an inner diameter of 17 mm, and a width of 11.2 mm is subjected to a radial load of 3577 N (365 kgf) and the inner ring is rotated at 3900 rpm, the creep force $F_{creep}$ generated on the outer ring is actually measured to be 356 N. In other words, the creep torque $T_{creep}$ is 6.942 N·m. Therefore, the shape of the fine protrusion 8 biting into the mating member 20 is designed so as to generate the static torque $T_{hold}$ equal to or greater than the above value.

First, a location where the protrusion is provided is determined (step S3 of FIG. 4). Since outer ring creep occurs under the usage conditions, the protrusion is provided on the outer diameter surface of the outer ring here.

Figure 3:
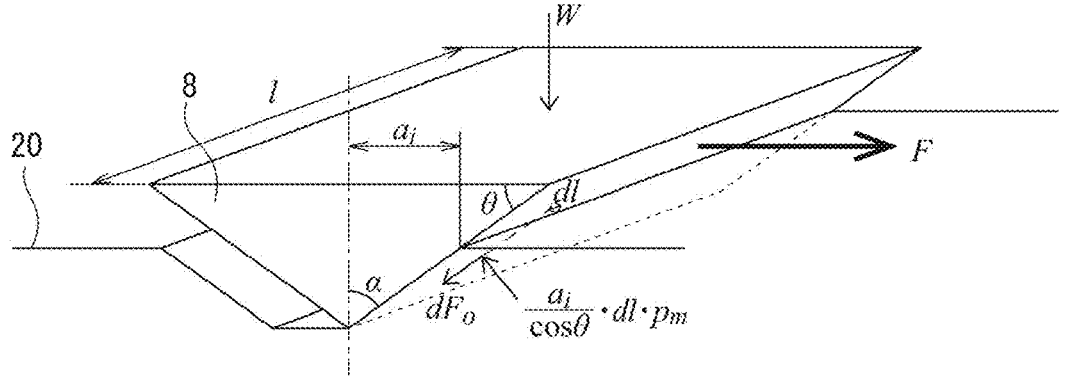
FIG. 3 is a schematic diagram illustrating a frictional force generated by a protrusion (ridge shape) biting into a mating member.

Next, the shape of the protrusion 8 is determined (step S4 of FIG. 4). In the present embodiment, for example, as one protrusion shape, the protrusion 8 (ridge shape) shaped like a lying isosceles triangular prism as illustrated in FIG. 3 is provided from one end face of the outer diameter surface 1g of the outer ring 1 to the other end face thereof. The number of protrusions 8 having the same shape required to stop creep is calculated (step S5 of FIG. 4).

Here, a frictional force F generated by one fine protrusion 8 biting into the mating member 20 can be represented by a sum of an adhesion term ($F_{adhesion}$), which is a resistance required to pull apart two solids rubbing against each other and sticking (adhering) to each other, and a ploughing term ($F_{ploughing}$), which is a resistance required for a harder one of the two solids rubbing against each other to deform a softer mate, as indicated below:

$$F = (F_{adhesion}) + (F_{ploughing})$$

Note that in FIG. 3, $a_i/\cos\theta$: slope length, dl: width (small), $p_m$: plastic flow pressure of housing material (hardness on the housing side (assuming that the housing in contact with the protrusion is completely plastically deformed)), $a_i/\cos\theta*dl*p_m$: force acting perpendicularly to the slope, $dF_0$: adhesion resistance acting on a minute section dl of the slope (acting parallel to the slope), in which $dF_0 = \mu*a_i/\cos\theta*dl*p_m$, $(X)dF_0\cos\theta$: adhesion resistance in a movement (arrow F) direction (an l-direction integral thereof is the adhesion term) ($dF = \mu*a_i*dl*p_m$), $a_i\times\tan\theta$: depth, $(Y)a_i\times\tan\theta\times dl\times p_m$: ploughing resistance in the movement (arrow F) direction (an l-direction integral thereof is the ploughing term), and (X)+(Y) is a frictional resistance.

Additionally, the static torque $T_{hold}$ generated by all the protrusions provided on the outer diameter surface of the outer ring can be represented by formula (2) using the frictional force F due to the protrusions and a distance r of half the outer diameter of the outer ring.

$$T_{hold} = \Sigma(F \times r) \tag{2}$$

In addition, when the provided protrusions have the same shape and n is the number of the protrusions, formula (2) can be represented as in the following formula (2'):

$$T_{hold} = n \times F \times r \tag{2'}$$

Furthermore, the adhesion term ($F_{adhesion}$) and the ploughing term ($F_{ploughing}$) can be represented by the following formulae (3) and (4), respectively. Here, in formulae (3) and (4), $\mu_a$ is a friction coefficient generated between two solids in contact, $p_m$ is a plastic flow pressure of a housing material, $A_{vp}'$ is a vertical projected area where the protrusions are in contact with the housing (a region of $a_i \times l$ in the case of the protrusions as illustrated in FIG. 3), and $A_{tp}$ is a tangential projected area where the protrusions are in contact with the housing (a region of $a_i \cdot \tan \theta \times l$ in the case of the protrusions as in FIG. 3).

$$F_{adhesion} = \mu_a \cdot p_m \cdot A_{vp}' \quad (3)$$

$$F_{ploughing} = p_m \cdot A_{tp} \quad (4)$$

When the protrusion 8 whose cross-sectional shape in an axial direction of the roller bearing 10 is like that of the lying isosceles triangular prism as illustrated in FIG. 3, is provided from the one end face of the outer diameter surface 1$g$ of the outer ring 1 of the roller bearing 10 to the other end face thereof, the frictional force F generated by each protrusion 8 can be estimated from the following formula (5). Here, $a_i$ is a contact half width of the protrusion 8, $\theta$ is a bottom angle of the protrusion 8, $a_i \cdot \tan \theta$ is a height of the protrusion 8, and l is a length of the protrusion 8.

$$F = F_{adhesion} + F_{ploughing} \quad (5)$$

$$= \mu_a \cdot p_m \cdot A_{vp}' + p_m \cdot A_{tp}$$

$$= \int_0^l \mu_a \cdot a_i \cdot dl \cdot p_m + \int_0^l a_i \cdot \tan\theta \cdot dl \cdot p_m$$

$$= \mu_a \cdot a_i \cdot l \cdot p_m + a_i \cdot \tan\theta \cdot l \cdot p_m$$

$$= (\mu_a + \tan\theta) a_i \cdot l \cdot p_m$$

For example, assume that the friction coefficient is 0.1, the contact half width of the protrusions 8 is 0.0247 mm, the plastic flow pressure of the housing material serving as the mating member 20 is 100 kgf/mm², and the outer diameter surface 1$g$ of the outer ring 1 is axially provided with the protrusions 8 having an average height of 13.3 μm and a length of 8.6 mm (there are chamfers at both ends thereof, so that the length of the provided protrusions 8 is shorter than the width of the roller bearing 10). From formula (5), the frictional force F per protrusion is as follows:

$$F = 0.1 \times 0.0247 \text{ mm} \times 8.6 \text{ mm} \times 100 \text{ kgf/mm}^2 + 0.0133 \text{ mm} \times 8.6 \text{ mm} \times 100 \text{ kgf/mm}^2 = 13.57 \text{ kgf } (133.0 \text{ N})$$

whereby it can be seen that a frictional force of 133.0 N is generated, and a static torque of 2.592 N·m is generated per protrusion. Therefore, when creep can be suppressed when a total static torque $T_{hold}$ generated by the protrusions 8 becomes equal to or greater than the creep torque $T_{creep}$, the occurrence of creep can be prevented when the following conditions are satisfied:

$$T_{hold}/T_{creep} \geq 1 \quad (6)$$

$$\Sigma(F \times r)/T_{creep} \geq 1 \quad (6')$$

$$n \times F \times r/T_{creep} \geq 1 \quad (6'')$$

Here, n is the number of the protrusions 8. In other words, when the shapes of the protrusions are the same, the occurrence of creep can be prevented by setting the number of the protrusions 8 biting into the mating member 20 to satisfy the following formula (7):

$$n \geq T_{creep}/(F \times r) \quad (7)$$

Therefore, in this example, $$n \geq 6.942 \text{ N·m}/2.592 \text{ N·m} = 2.7$$

Therefore, in the case of the protrusion as illustrated in FIG. 3 (the protrusion that is 13.3 μm high and 8.6 μm long), providing three or more protrusions 8 on the outer diameter surface 1$g$ serving as the fitting surface can generate the static torque $T_{hold}$ greater than the creep torque $T_{creep}$, so that the occurrence of creep can be prevented.

As described above, the frictional force F generated by the protrusions 8 biting into the mating member 20 can be represented by formula (5). However, as can be seen from formula (5), when the protrusion 8 is not present, the bottom angle $\theta$ is zero. Therefore, no ploughing resistance occurs, and only adhesion resistance occurs.

In other words, the adhesion term ($F_{adhesion}$) is working even without the protrusion 8. Accordingly, considering that an increase in the frictional force F generated by providing the protrusion 8 is only the ploughing term ($F_{ploughing}$), and the occurrence of creep can be prevented when the static torque $T_{hold}$ due to the increase exceeds the creep torque $T_{creep}$, formula (7) can be represented as in the following formula (8):

$$n \geq T_{creep}/(F_{ploughing} \times r) \quad (8)$$

For example, assume that, in the case where the protrusion 8 shaped like the lying isosceles triangular prism as illustrated in FIG. 3 is provided from the one end of the outer diameter surface 1$g$ of the outer ring 1 to the other end face thereof, the material of the housing 20A serving as the mating member 20 of the fitting surface has a plastic flow pressure of 100 kgf/mm², and the outer diameter surface 1$g$ of the outer ring 1 is axially provided with the protrusion 8 that is 13.3 μm high and 8.6 mm long. From formula (5), the ploughing resistance per protrusion is as follows:

$$F = F_{ploughing}$$

$$= \int_0^l a_i \cdot \tan\theta \cdot dl \cdot p_m$$

$$= a_i \cdot \tan\theta \cdot l \cdot p_m$$

$$= 0.0133 \text{ mm} \times 8.6 \text{ mm} \times 100 \text{ kgf/mm}^2 = 11.438 \text{ kgf}( = 112.1 \text{ N})$$

Thus, a ploughing resistance of 112.1 N is generated per protrusion, and a static torque of 2.186 N·m is generated per protrusion. Therefore, from formula (8), $$n \geq 6.942 \text{ N·m}/2.186 \text{ N·m} = 3.2$$

As a result, in the case of the protrusion 8 as illustrated in FIG. 3 (the protrusion that is 13.3 μm high and 8.6 mm long), providing four or more protrusions 8 on a part of the outer diameter surface 1$g$ of the roller bearing 10 can generate the static torque $T_{hold}$ greater than the creep torque $T_{creep}$, thus allowing for the prevention of occurrence of creep. As described here, supporting the force generated by creep only by the ploughing resistance requires a slightly large number of the protrusions 8, which results in a surface that is closer to a safe side and even less prone to creep.

A flow illustrated in FIG. 4 is a flow in which the shape of the protrusion is determined in advance, and then the number of the protrusions required to prevent the occurrence of creep is obtained. However, after determining the number of the protrusions in advance, the shape (height, length, and width) of the protrusions may be obtained.

Additionally, although only the protrusion shape as illustrated in FIG. 3 has been described above, the protrusion is not limited thereto. The protrusion shape may be any of shapes as illustrated in FIGS. 11A to 11D, such as a dot shape and a cross shape. The frictional force in such a case may be obtained by formulae *1 to *3 described later.

Note that although the deep groove ball bearing has been exemplified, the present invention is not limited thereto, and can be similarly applied to other bearing types (cylindrical roller bearings, conical roller bearings, angular contact ball bearings, self-aligning roller bearings, thrust ball bearings, needle bearings, etc.), allowing for the prevention of occurrence of creep.

Note that, in the present embodiment, the frictional force is increased by biting of the protrusion 8 provided on the fitting surface of the roller bearing 10 into the housing or the shaft serving as the mating member 20, and therefore the protrusion 8 provided on the fitting surface of the roller bearing 10 needs to be harder than the housing material or a shaft material serving as the mating member 20.

More preferably, the hardness of the protrusion 8 provided on the fitting surface of the roller bearing 10 is three or more times harder than the housing material or the shaft material serving as the mating member 20 (the housing or the shaft serving as the mating member corresponding to the fitting surface has a hardness equal to or less than ⅓ of the hardness of the protrusion 8 provided on the fitting surface of the roller bearing 10).

In this case, without yielding of the protrusion 8, only the mating member 20 is plastically deformed, and the height of the protrusion 8 provided on the fitting surface of the roller bearing 10 surely bites into the mating member 20, thus allowing for accurate estimation of the ploughing resistance.

Additionally, in the present embodiment, preferably, a value p of a radial load $F_r$ acting on the roller bearing 10 divided by a total vertical projected area $A_{vp}$ of the protrusion 8 provided on the fitting surface of the roller bearing 10 is equal to or more than the plastic flow pressure $P_m$ of the mating member 20:

$$p = F_r / A_{vp} \geq p_m \tag{9}$$

For example, in the case of the protrusion 8 as illustrated in FIG. 3, the value p of the radial load $F_r$ divided by $2 \cdot a_i \cdot 1 \cdot n$, which is a product of a contact width $2 \cdot a_i$ of the protrusion 8, a length 1 of the protrusion 8, and the number n of the protrusions 8, is set to be equal to or more than the plastic flow pressure $P_m$ of the mating member 20. For example, when the contact width of the protrusion 8 is 0.0493 mm, the length of the protrusion 8 is 8.6 mm, the number of the protrusions 8 is 4, and the radial load $F_r$ is 3577 N (365 kgf), $$p = F_r / (2 \cdot a_i \cdot 1 \cdot n) = 365 \text{ kgf} / (0.0493 \text{ mm} \cdot 8.6 \text{ mm} \cdot 4)$$
$$= 215.2 \text{ kgf/mm}^2 \geq 100 \text{ kgf/mm}^2$$

Thus, p is equal to or more than the plastic flow pressure (100 kgf/mm²) of the mating member 20, so that the protrusion 8 completely bites into the mating member 20 side, which allows for accurate estimation of the ploughing resistance generated by a geometric shape of the formed protrusion 8.

On the other hand, when formula (9) is not satisfied, the protrusion 8 provided on the fitting surface of the roller bearing 10 does not completely bite into the mating member 20 side. Therefore, since the frictional force is smaller than the frictional force generated by the geometric shape of the formed protrusion 8, it is difficult to estimate the frictional force accurately. In this case, the shape of a mark of the protrusion 8 remaining on the mating member 20 side may be measured to obtain a bite depth, and then the frictional force may be estimated from formula (5).

(When Providing Fine Protrusion on End Face)

As illustrated in FIG. 5, when providing a protrusion 9 biting into the mating member on an end face of the outer ring 1 or the inner ring 2 of the roller bearing 10, it is preferable for the protrusion 9 to be provided continuously in a radial shape (a radial direction) to generate a greater ploughing resistance.

For example, as in FIG. 5, when providing the protrusion on the end face of the outer ring 1, a center radius r' of the protrusion is located inside the outer diameter surface 1g of the outer ring 1. In this case, the static torque generated by the protrusion is represented as follows:

$$T_{hold} = \Sigma(F' \times r')$$

F' is a frictional force generated by one protrusion on the end face of the outer ring, F' being either a frictional force including the adhesion term ($F_{adhesion}$) and the ploughing term ($F_{ploughing}$) (a force preventing the outer ring or the inner ring from creeping, which force acts in a direction opposite to the direction of rotation due to creep) or a frictional force due only to the ploughing term ($F_{ploughing}$), and r' is a distance from a center of the bearing to a center of the at least one protrusion present on the end face of the outer ring or the inner ring. In addition, $\Sigma(F' \times r')$ is a static torque $T_{hold}$ generated by all the at least one protrusion. When the at least one protrusion has the same shape, the static torque $T_{hold} = n \times F' \times r'$. When the center radii of the at least one protrusion provided on the end face are different, $F' \times r'$ is calculated for each protrusion, and a total sum thereof is used as the static torque $T_{hold}$. The shape and number of the protrusions are set so that the static torque $T_{hold}$ is greater than the creep torque $T_{creep}$.

Furthermore, the adhesion term ($F_{adhesion}$) and the ploughing term ($F_{ploughing}$) generated by the at least one protrusion provided on the end face can be obtained from the following formulae:

$$F_{adhesion} = \mu_a \cdot p_m \cdot A'_{vp} \tag{3}$$

$$F_{ploughing} = p_m \cdot A_{tp} \tag{4}$$

Here, $\mu_a$ is a friction coefficient generated between the two solids in contact, $p_m$ is a plastic flow pressure of the housing material, $A_{vp}'$ is a vertical projected area where the at least one protrusion present on the end face is in contact with the housing (a region of $a_i \times l$ in the case where the protrusion as illustrated in FIG. 3 is radially formed on the end face), and $A_{tp}$ is a tangential projected area where the protrusion is in contact with the housing (a region of $a_i \cdot \tan \theta \times l$ in the case where the protrusion as in FIG. 3 is radially formed on the end face).

This is an example where the at least one protrusion is provided on the end face of the outer ring. However, even when the at least one protrusion is provided on the end face of the inner ring in the case where creep occurs in the inner ring, the static torque $T_{hold}$ may be obtained in the same procedure as when providing the at least one protrusion on the end face of the outer ring, and the shape and number of the protrusions may be set so that the static torque $T_{hold}$ is greater than the creep torque $T_{creep}$.

(How to Form Fine Protrusion and where to Provide Protrusion)

Once the shape and number of the protrusions 8 (or the protrusions 9) are determined, the determined number of the protrusions 8 (or the protrusions 9) are formed on the outer diameter surface 1g serving as the fitting surface of the outer ring 1 (or the end face in the case of the protrusions 9) (step S6 of FIG. 4).

As a method for providing the protrusion 8 on the fitting surface of the roller bearing 10, plastic working such as micro forming may be used, or machining by an electron beam or a laser beam may be performed. Alternatively, a protruding portion may be left by scraping the surroundings of the portion through chemical or electrical etching or machining by cutting or grinding, or a protruding portion may be added by arc welding, gas welding, laser welding, laser cladding, pattern plating, or CVD/PVD.

Depending on the processing method for providing a fine protrusion, the processing may, on the surface, introduce defects such as cracking, generate residual stress, or reduce strength due to softening. Additionally, when the wall thickness of the raceway ring is thin, rolling of the rolling elements may generate high stress on the outer diameter surface of the outer ring or the inner diameter surface of the inner ring, whereby damage may occur from a processed portion. In such a case, the damage can be avoided by not performing the processing on a place where generated stress is high, i.e., the outer diameter surface of the outer ring and the inner diameter surface of the inner ring corresponding to the back of a place where the rolling elements pass through but performing the processing on both sides or one side thereof.

Specifically, when providing the protrusion 8 on the outer diameter surface 1g of the outer ring 1 in a case where outer ring creep occurs, it is preferable not to perform the processing in a range corresponding to ±10% of a rolling element diameter in the axial direction (for example, a width of 1.35 mm when the rolling element diameter is 6.747 mm) assuming that a portion directly behind the center of a contact portion between the rolling elements 3 and the raceway surface of the outer ring 1 is 0. More preferably, the processing is not performed in a range corresponding to ±25% of the rolling element diameter in the axial direction (for example, 3.37 mm when the rolling element diameter is 6.747 mm).

Note that in this case, although it is obvious, the frictional force F generated by the fine protrusion 8 biting into the mating member 20 needs to be calculated excluding an unprocessed portion.

Additionally, in the case where outer ring creep occurs, the location where the protrusion 8 is provided in the roller bearing 10 may be the outer diameter surface 1g serving as the fitting surface of the outer ring 1 or may be the housing side serving as the mating member 20. For example, when the outer ring 1 is made of resin, the fine protrusion may be provided on the housing side to increase friction. The same applies to a case where inner ring creep occurs, in which the protrusion may be provided on the inner diameter surface serving as the fitting surface of the inner ring 2 or on the shaft side serving as the mating member 20.

Preferably, the protrusion 8 is provided continuously in parallel to the axial direction of the fitting surface. In other words, because creep is a behavior that moves in the circumferential direction, and a tangential projected area of the protrusion 8 in a direction perpendicular to the movement, i.e., in the axial direction of the roller bearing 10 acts as ploughing resistance. Therefore, it is more efficient and preferable to provide the protrusion 8 continuously in parallel to the axial direction of the roller bearing 10.

Additionally, a large circumferential cross-sectional area of the protrusion 8 may generate high ploughing resistance depending on fitting dimensions when inserting the roller bearing 10 into the housing or the shaft, and may make it difficult to set the roller bearing 10. Therefore, the protrusion 8 is preferably provided so as to minimize the circumferential cross-sectional area thereof, i.e., provided in parallel to the axial direction of the roller bearing 10.

Furthermore, when outer ring creep occurs in a case where radial as well as axial loads act on the roller bearing 10, the protrusion 9 may be provided not only on the outer diameter surface 1g of the outer ring 1 but also on an end face of the outer ring 1, as illustrated in FIG. 5. Alternatively, the protrusion 9 may be provided only on the end face 7 of the outer ring 1 without providing them on the outer diameter surface 1g of the outer ring 1.

(Matters Related to Friction)

Friction consists of two forces, adhesion resistance, which is a force required for two solids rubbing against each other to stick together and tear apart, and ploughing resistance, which is a force required for a harder one of the two solids to bite into a softer one and deform the softer mating material. The former, adhesion resistance, is strongly affected by a lubricant in a lubricating atmosphere, so that it is difficult to increase adhesion resistance.

On the other hand, the latter, ploughing resistance, can be controlled by a geometric shape of a surface. Thus, in the present embodiment, at least one fine protrusion is provided on the surface of the fitting surface or the end face of the outer ring or the inner ring on the side including the fitting surface, and the protrusion bites into the mating material to increase the ploughing resistance, thereby suppressing creep. Note that in the case of the shape as illustrated in FIG. 3, the frictional force F can be represented by the following formula:

$$F = \int_0^1 \mu_a \cdot a_i \cdot dl \cdot p_m + \int_0^1 a_i \cdot \tan\theta \cdot dl \cdot p_m = (\mu_a + \tan\theta)a_i \cdot l \cdot p_m$$

(Other Protrusion Shapes)

The following are frictional forces generated by the protrusion 8 or 9 having a conical shape, a spherical shape, and a conical shape with a rounded tip, other than the protrusion shape illustrated in FIG. 3.

[1] When the protrusion is conical (see NPL 1)

Figure 6:
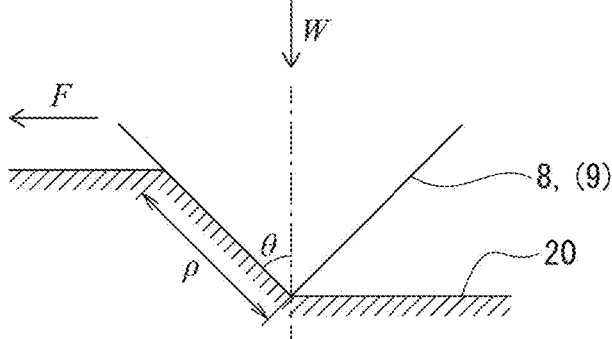
FIG. 6 is a schematic diagram illustrating a frictional force generated by a conical protrusion.

As illustrated in FIG. 6, when the shape of the protrusion 8 or 9 is conical, the frictional force generated is represented as follows:

$$F = F_{adhesion} + F_{ploughing}$$
$$= \mu_a \cdot p_m \cdot A'_{vp} + P_m \cdot A_{tp}$$
$$= \mu_a \cdot p_m \cdot (\pi/2) \cdot \rho^2 \cdot \sin^2\theta + p_m \cdot \rho^2 \cdot \sin\theta\cos\theta$$

Here, $p_m$ is a plastic flow pressure of the softer one, $\rho$ is a length of a contact arc between the protrusion and the mating material, and $\theta$ is a half angle of the protrusion.

[2] When the protrusion is spherical (see NPL 1)

Figure 7:
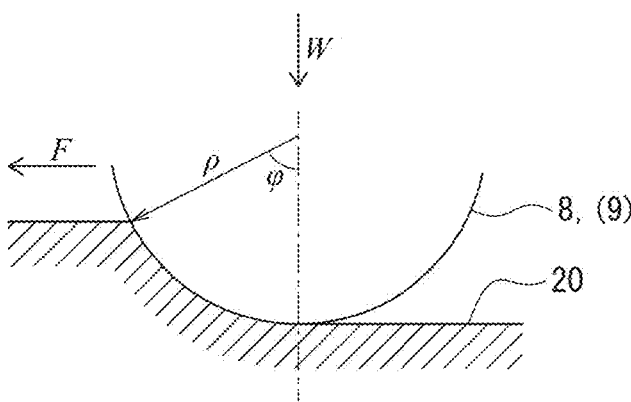
FIG. 7 is a schematic diagram illustrating a frictional force generated by a spherical protrusion.

As illustrated in FIG. 7, when the shape of the protrusion 8 or 9 is spherical, the frictional force generated is represented as follows:

$$F = F_{adhesion} + F_{ploughing}$$

-continued $$= \mu_a \cdot p_m \cdot A'_{vp} + P_m \cdot A_{tp}$$

$$= \mu_a \cdot p_m \cdot (\pi/2) \cdot \rho^2 \cdot \sin^2\phi + p_m \cdot (1/2) \cdot \rho^2(2\phi - \sin2\phi)$$

Here, $p_m$ is a plastic flow pressure of the softer one, $\rho$ is a radius of curvature of the sphere, and $\phi$ is a contact angle between the protrusion and the mating member.

[3] When the protrusion has a conical shape with a rounded tip (referred to also as "sinusoidal" shape in the present specification) (see NPL 1)

Figure 8:
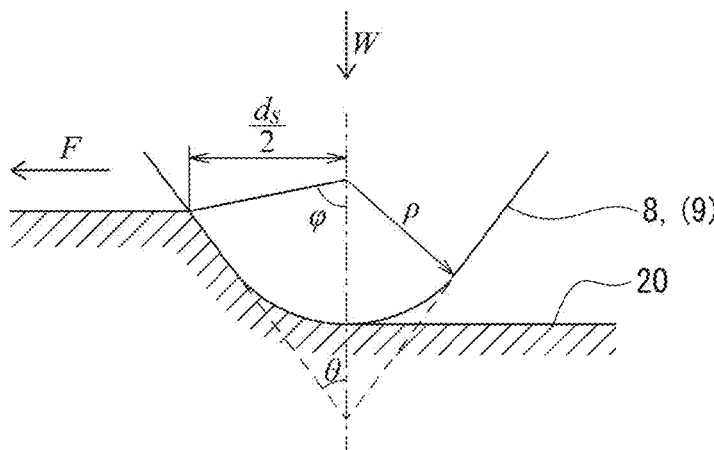
FIG. 8 is a schematic diagram illustrating a frictional force generated by a conical protrusion having a rounded tip.

As illustrated in FIG. 8, when the shape of the protrusion 8 or 9 is "sinusoidal", i.e., a conical shape with a rounded protrusion tip, the frictional force generated is represented as follows:

$$F = F_{adhesive} + F_{ploughing}$$

$$= \mu_a \cdot p_m \cdot A'_{vp} + p_m \cdot A_{tp}$$

$$= \mu_a \cdot p_m \cdot \frac{\pi}{8} \cdot d_S^2 + p_m \cdot \left[\frac{1}{4}d_s^2\cot\theta - \rho^2\left(\cot\theta + \theta - \frac{\pi}{2}\right)\right]$$

Here, $p_m$ is a plastic flow pressure of the softer one, $d_s$ is a contact width between the protrusion and the mating member, $\rho$ is a radius of curvature of the rounded tip, and $\phi$ is a half angle of the conical shape. In the case of protrusion shapes other than the shape as illustrated in FIG. 3 and those in formulae [1] to [3] above, the frictional force generated by the protrusion is obtained by the following formula (*1):

$$F = F_{adhesion} + F_{ploughing} \qquad (*1)$$

Additionally, the adhesion term $F_{adhesion}$ and the ploughing term $F_{ploughing}$, respectively, can be represented by the following formulae (*2) and (3*):

$$F_{adhesion} = \mu_a \cdot p_m \cdot A'_{vp} \qquad (2^*)$$

$$F_{ploughing} = p_m \cdot A_{tp} \qquad (3^*)$$

Here, $\mu_a$ is a friction coefficient generated between the two solids in contact, $p_m$ is a plastic flow pressure of the housing material, $A_{vp}'$ is a vertical (normal) projected area where the protrusion 8 is in contact with the housing 20A, and $A_{tp}$ is a tangential projected area where the protrusion 8 is in contact with the housing 20A.

Note that when providing continuous protrusions in the axial direction in the case where the protrusions are provided on the outer diameter surface of the outer ring or the inner diameter surface of the inner ring, the adhesion term $F_{adhesion}$ and the ploughing term $F_{ploughing}$, respectively, can be represented by the following formulae (*2') and (*3'):

$$F_{adhesion} = \mu_a \cdot p_m \cdot A'_{vp} \qquad (*2')$$

$$= \mu_a \cdot p_m \cdot a_i \cdot 1$$

$$F_{ploughing} = p_m \cdot A_{tp} \qquad (*3')$$

$$= p_m \cdot h \cdot 1$$

Here, $\mu_a$ is a friction coefficient generated between the two solids in contact, $p_m$ is a plastic flow pressure of the housing material, $a_i$ is a vertical (normal) contact half width where the protrusions are in contact with the mating member, h is a protrusion height (a tangential contact width where the protrusions are in contact with the mating member), and l is an axial length of the protrusion.

Note that when the continuous protrusions are provided inclinedly with respect to the axial direction, the adhesion term $F_{adhesion}$ and the ploughing term $F_{ploughing}$, respectively, can be represented by the following formulae (*2") and (*3"):

$$F_{adhesion} = \mu_a \cdot p_m \cdot A'_{vp} \qquad (*2'')$$

$$= \mu_a \cdot p_m \cdot a_i \cdot 1'$$

$$F_{ploughing} = p_m \cdot A_{tp} \qquad (*3'')$$

$$= p_m \cdot h \cdot 1$$

Here, $\mu_a$ is a friction coefficient generated between the two solids in contact, $p_m$ is a plastic flow pressure of the housing material, $a_i$ is a vertical (normal) contact half width where the protrusions are in contact with the housing, l' is a protrusion length (an actual end-to-end length of the protrusion), h is a protrusion height (a tangential contact width where the protrusions are in contact with the mating member), and l is an axial length (a tangential projected length) of the protrusions.

The static torque $T_{hold}$ is a product of the frictional force due to the protrusions obtained from the above formula and a radius of rotation where the protrusions are present (the distance from the center of the bearing to the center of the protrusions). The radius of rotation where the protrusions are present is the distance of half the outer diameter of the outer ring or the inner diameter of the inner ring when the protrusions are present on the outer diameter surface of the outer ring or the inner diameter surface of the inner ring, and is the distance from the center of the bearing to the center of the protrusions present on the end face of the outer ring or the inner ring when the protrusions are present on the end face of the outer ring or the inner ring.

(Examples of Protrusion Processing Location)

Arrangement examples of the location and number of protrusions to be processed are described.

Figure 15A:
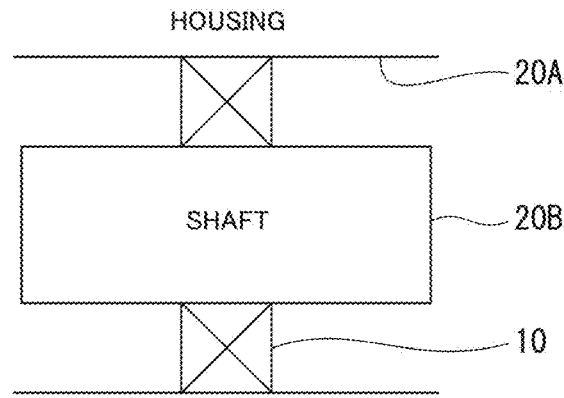
Figure 15B:
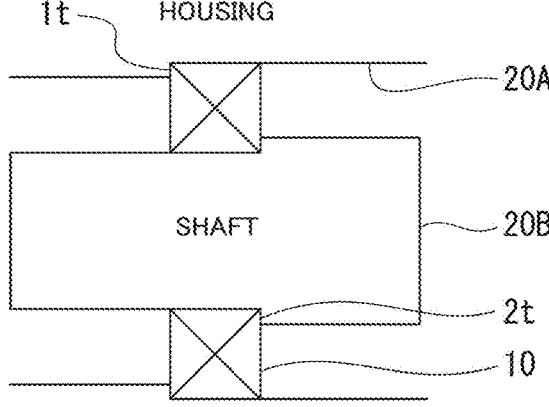

When forming the protrusion 8 biting into the mating member 20 on the fitting surface of the outer ring 1 or the inner ring 2 of the roller bearing 10 having a layout as illustrated in FIG. 15A, a pattern along the axial direction is preferable, as illustrated in FIGS. 9A to 9K. As exemplified in FIGS. 9A to 9K, the protrusion 8 is formed so as to be biased to a part of the outer ring 1 or the inner ring 2 in the circumferential direction thereof on the fitting surface. Preferably, the location where the protrusion 8 is positioned in a load region when fitted into the mating member 20.

In other words, creep can be prevented when the protrusion 8 satisfying the conditions of the present invention is arranged in the load region. Although lowering the height of the protrusion 8 reduces the frictional force, increasing the number of the protrusions 8 to be set can compensate for that. On the contrary, when the height of the protrusion is increased, a small number of the protrusions allows for the prevention of creep.

In the present invention, creep can be prevented by the fine protrusion 8, as well as the protrusion 8 smaller than the tolerance of a clearance fit can be set. Thus, particularly when arranging the protrusion 8 to be biased to a part of the outer ring 1 or the inner ring 2 in the circumferential direction, assembly can be easily made without damaging the mating member 20 by incorporating a portion formed without the protrusion as a guide surface into the mating member 20 when assembling.

Figures 10A, 10B, 10C, 10D, 10E, 10F:
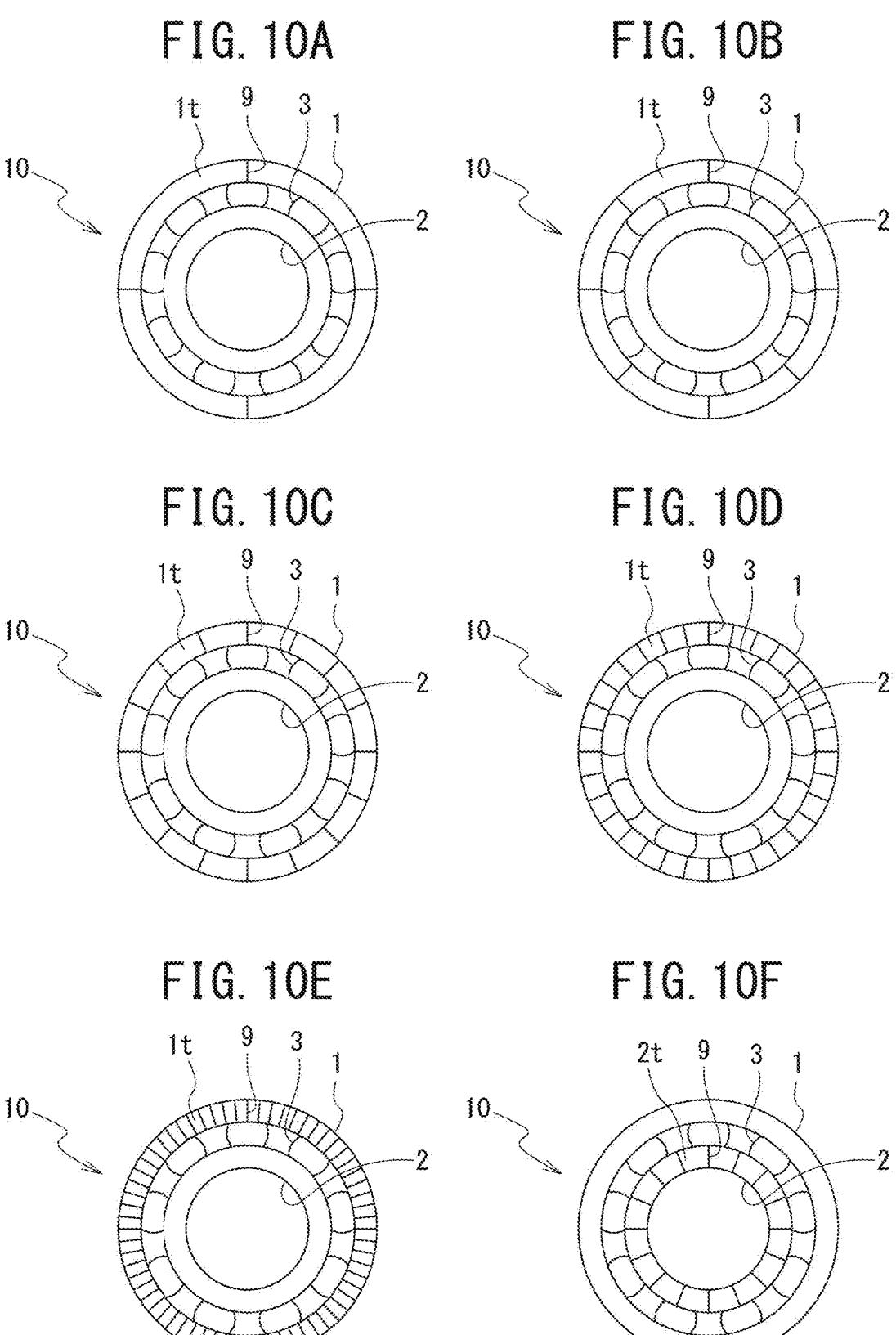
FIGS. 10A to 10F are diagrams illustrating various examples where protrusions biting into the mating member are formed on the end face of the outer ring to be fitted or an end face of the inner ring to be fitted of the roller bearing.

Additionally, in the case of a layout as illustrated in FIG. 15A, when, as illustrated in FIGS. 10A to 10F, forming the protrusions 9 biting into the mating member 20 on the end face of the outer ring 1 or the inner ring 2 of the roller bearing, a radial pattern is preferable, as exemplified in FIGS. 10A to 10F. Note that the protrusions 9 may be equally spaced or biased. FIGS. 10A to 10E are examples corresponding to outer ring creep, and FIG. 10F is an example corresponding to inner ring creep.

The plurality of protrusions 8 is not limited to being equally spaced, and when the protrusions 8 are in a form of lines or dots, an extension direction or alignment direction thereof is also not limited to the axial direction of the roller bearing 10. The protrusions 8 are only required to have a frictional force acting in a direction opposite to the direction of creep greater than creep force. The form, number, and direction of the protrusions 8 are not limited. For example, the protrusions 8 may be one dot. Alternatively, for example, as illustrated in FIGS. 11A to 11D, the protrusions 8 may be of a diagonal line (spiral) shape or of a crosshatch shape. However, the protrusions 8 are preferably arranged only near one end face of the outer diameter surface 1g of the outer ring or an inner peripheral surface 2n of the inner ring 2 on the fitting surface of the roller bearing 10. For example, the plurality of protrusions 8 can be arranged at equal spacing in the circumferential direction and near the one end face thereof in the axial direction.

Figure 16A:
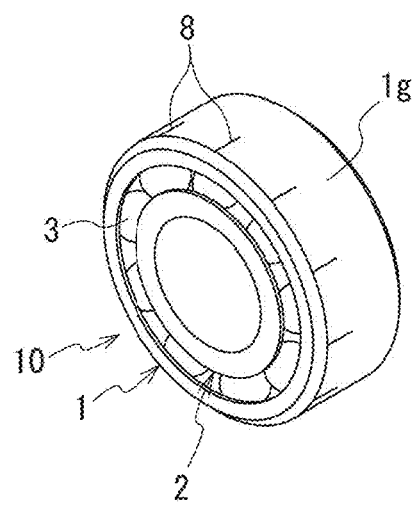
Figure 16B:
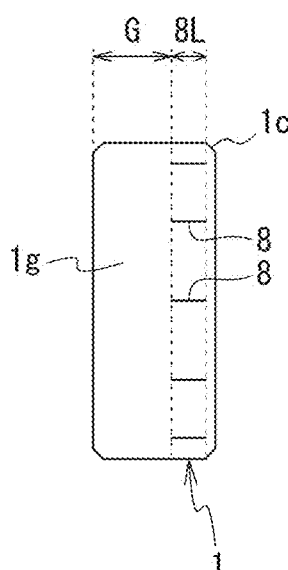

For example, in an example illustrated in FIGS. 16A and 16B, the plurality of protrusions 8 on the outer diameter surface 1g of the outer ring 1 is not formed from one end face of the outer ring 1 of the roller bearing 10 to the other end face thereof but is formed only near the one end face. In this case, the number, circumferential spacing, and axial length (sign 8L) of the protrusions 8 to be formed on the fitting surface can be appropriately changed according to a creep force generated.

With such a configuration, the other end face of the outer ring 1 where the protrusions 8 are not formed on the fitting surface can be served as a guide surface (sign G) when fitting the roller bearing 10 into the mating member 20. In other words, when fitting the roller bearing 10 into the mating member 20 such as a housing, it is fitted thereinto from the guide surface G side without the protrusions 8. This allows for smooth insertion of the outer ring 1 into the mating member 20, thus improving assemblability.

In the example illustrated in FIGS. 16A and 16B, the plurality of protrusions 8 is provided at an equal interval in the circumferential direction on the one end face. If arrangement of the plurality of protrusions 8 in the circumferential direction is biased, the roller bearing 10 tilts when the protrusions 8 contact with the mating member 20, and cannot be inserted in parallel to the mating member 20, whereby galling is likely to occur. Therefore, preferably, the plurality of protrusions 8 provided on the fitting surface is equally spaced in the circumferential direction. Additionally, in the drawing, sign 1c indicates a chamfer. An extending range of the protrusions 8 formed on the fitting surface may be formed including a portion with the chamfer 1c or may be provided not to be formed on the portion with the chamfer 1c.

(Examples of Protrusion Shape)

In addition, the processed shape of the protrusion 8 or 9 is not limited to the pattern along the axial direction or the radial pattern, and various patterns can be employed. For example, as in the actual processing examples illustrated in FIGS. 11A to 11D, the pattern may be, besides an axial direction pattern (FIG. 11A), an oblique pattern (FIG. 11B), an intersecting pattern (FIG. 11C), a dot pattern (FIG. 11D), or the like. FIG. 12 illustrates an external photograph of the bearing actually subjected to nanosecond pulsed laser processing.

Figure 13:
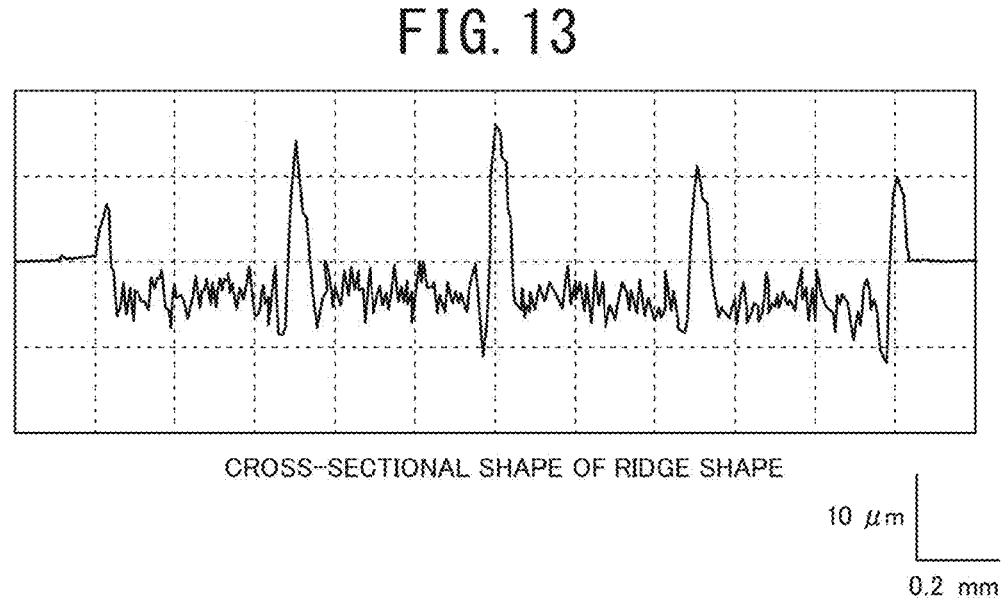
FIG. 13 is a graph illustrating an example of a cross-sectional shape of the protrusions formed on the fitting surface of the outer ring of the roller bearing.
Figures 14A, 14B, 14C:
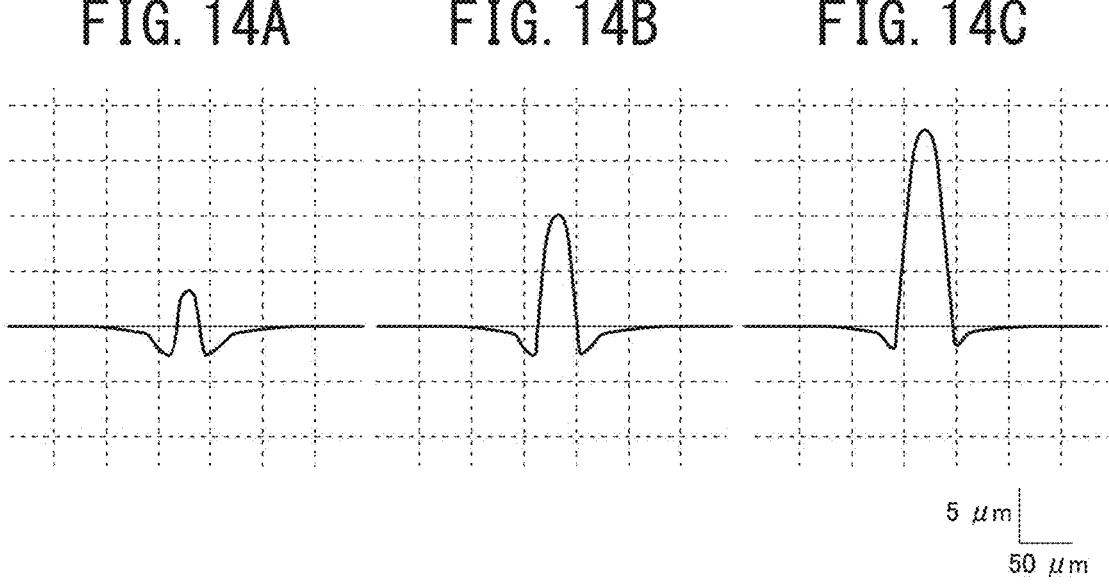
FIGS. 14A to 14C are diagrams illustrating examples of cross-sectional shapes of protrusions formed on the fitting surface of the outer ring of the roller bearing.

A cross-sectional shape of the actually processed protrusions illustrated in FIG. 12 was measured. FIG. 13 illustrates results of the measurement. As can be seen from the drawing, a desired fine protrusion shape is formed. Note that when processing the protrusions, grooves may be formed in a vicinity of the protrusions. For example, FIGS. 14A to 14C illustrate cross-sectional shapes of protrusions formed by a CW laser. As illustrated in the drawings, it can be seen that the protrusions are formed in the center, and grooves are formed on both sides thereof.

As described above, the roller bearing 10 according to the present embodiment is the roller bearing 10 used by fitting the outer diameter surface 1g of the outer ring 1 to the housing 20A or by fitting the shaft 20B to the inner diameter surface 2n of the inner ring 2, in which the fitting surface of the outer ring or the inner ring to be fitted or the end face of the outer ring to be fitted or the end face of the inner ring to be fitted is provided with a number of the protrusions biting into the mating member equal to or more than the number that satisfies the conditions of the desired (formula). Thus, the protrusions allow excellent creep resistance to be maintained stably over a long period. Additionally, the roller bearing can be provided that does not increase the size of the bearing, and on the contrary, can reduce the wall thicknesses of the rings, leading to size reduction, and moreover can suppress cost increase as much as possible.

Note that the roller bearing according to the present invention is not limited to the above embodiment, and it is obvious that various modifications can be made without departing from the gist of the present invention.

Hereinafter, Example is described with reference to FIG. 4. In the present Example, a surface design was made to prevent outer ring creep that occurs under the following usage conditions, and creep suppression effect was evaluated.

[Step 1] Determination of Bearing Shape and Bearing Usage Conditions (Step S1)

First, the bearing shape and bearing usage conditions were determined as follows:

Bearing: deep groove ball bearing (outer diameter 39 mm, inner diameter 17 mm, width 11.2 mm)

Radial load: 365 kgf

Rotation speed: 3900 rpm

Lubrication: CVT fluid

Housing: aluminum alloy (ADC 12)

*Inner ring: shrink fit, *outer ring: clearance fit

*Evaluate whether or not creep occurs 3 minutes after the start of rotation

Creep has occurred if the outer ring has rotated relative to the housing.

No creep has occurred if the outer ring has not rotated relative to the housing

[Step 2] Actual Measurement of Creep Torque (Step S2)

Creep torque was actually measured under the conditions determined at step 1 above. As a result, a creep torque of 6.94 Nm was obtained.

[Step 3] Determination of where to Provide Protrusions (Step S3)

Next, the location of the protrusions to be provided is determined. Outer ring creep occurs under the conditions of the present Example, so that the protrusions are provided on the outer diameter surface of the outer ring.

[Step 4] Determination of Protrusion Shape (Step S4)

Next, the protrusion shape is determined. The present Example assumes that protrusions shaped like the lying isosceles triangular prism as illustrated in FIG. 3 are provided from one end face to the other end face of the outer diameter surface of the outer ring of the bearing.

[Step 5] Determination of the Height and Number of the Protrusions that Generate a Static Torque Equal to or Greater than the Creep Torque (Step S5)

Next, the height and number of the protrusions that generate a static torque equal to or greater than the creep torque are determined.

[Step 6] Protrusion Providing Processing (Step S6)

Processing is performed to provide desired protrusions on the set location. In the protrusion providing processing, conditions for a nanosecond pulsed laser were changed to control protrusion height and protrusion width, and the processing was performed on the outer diameter surface of the outer ring of the bearing. Table 1 illustrates the number of the protrusions, protrusion height, protrusion width, adhesion resistance and ploughing resistance generated by the protrusions, frictional force, and static torque generated by the protrusions.

Note that the protrusion height and the protrusion width were represented by average values of the formed protrusions. Additionally, the table also gives values of static torque divided by creep torque. When the values are equal to or more than 1, it shows that the static torque is equal to or greater than the creep torque, and it is considered that creep is suppressed. FIG. 12 illustrates the example of the appearance of the processed bearing. Furthermore, FIG. 13 illustrates the example of a profile of the protrusions.

1*k*: Raceway surface (of outer ring)
1*t*: End face of outer ring
2: Inner ring
2*n*: Inner peripheral surface (fitting surface) (of inner ring)
2*k*: Raceway surface (of inner ring)
2*t*: End face of inner ring
3: Rolling element (ball)
8: Protrusion on fitting surface (fitting portion protrusion)
9: Protrusion on end face (end face protrusion)
10: Roller bearing
20: Mating member

The invention claimed is:

1. A roller bearing comprising:
an outer ring having a first side that defines a mounting surface and a second side that is opposite to the first side and that defines an outer ring raceway surface;
an inner ring having a first side the defines a mounting surface and a second side that is opposite to the first side and that defines an inner ring raceway surface; and
a plurality of rolling elements rollably interposed between the outer ring raceway surface and the inner ring raceway surface, wherein
the mounting surface of the outer ring is configured to non rollably couple the roller bearing to a housing,
the mounting surface of the inner ring is configured to non rollably couple the inner ring to a shaft,
the mounting surface of the outer ring has a first region in which protrusions are defined and a second region that is: i) adjacent to the first region, and ii) devoid of any protrusions, and
the first region extends from a first axial end of the mounting surface of the outer ring to a second axial end of the mounting surface of the outer ring, and

TABLE 1

|  | Number of protrusions | Average protrusion height μm | Average protrusion width μm | Adhesion term N | Ploughing resistance N | Average frictional force per protrusion N | Total frictional force N | Static torque Nm | Static torque/creep torque | Bearing test results |
|---|---|---|---|---|---|---|---|---|---|---|
| Ex. 1 | 5 | 13.3 | 49.3 | 20.8 | 112.2 | 133.0 | 665.1 | 13.0 | 1.9 | No creep occurred |
| Ex. 2 | 5 | 28.6 | 79.0 | 33.3 | 240.8 | 274.1 | 1370.5 | 26.7 | 3.8 | No creep occurred |
| Ex. 3 | 40 | 7.8 | 44.0 | 18.5 | 65.6 | 84.1 | 3364.8 | 65.6 | 9.5 | No creep occurred |
| Ex. 5 | 15 | 6.1 | 43.6 | 18.4 | 51.6 | 70.0 | 1049.8 | 20.5 | 2.9 | No creep occurred |
| Ex. 6 | 5 | 6.5 | 39.7 | 16.7 | 55.1 | 71.8 | 359.2 | 7.0 | 1.0 | No creep occurred |
| Com. Ex. 1 | 0 | 0.0 | 0.0 | 0.0 | 0.0 | 0.0 | 0.0 | 0.0 | 0.0 | Creep occurred |
| Com. Ex. 2 | 2 | 8.8 | 37.9 | 16.0 | 73.9 | 89.9 | 179.8 | 3.5 | 0.5 | Creep occurred |

A test was performed under the bearing operation conditions determined at step 1 above, and the presence or absence of occurrence of creep was investigated. Results confirmed that creep does not occur when static torque is greater than creep torque.

REFERENCE SIGNS LIST

1: Outer ring
1*g*: Outer diameter surface (fitting surface) (of outer ring)

the first region is only one region, and a second region, which is a remainder of the mounting surface of the outer ring, is larger than the first region and is devoid of any protrusions.

2. The roller bearing according to claim 1, wherein the first region defines a line that extends along the axial direction of the roller bearing.

3. The roller bearing according to claim 1, wherein protrusions have a conical shape.

4. An apparatus comprising:

the roller bearing according to claim 1, wherein
the protrusions of the outer ring frictionally engage the
housing to thereby prevent creep of the roller bearing.

* * * * *